Sept. 24, 1968 J. W. OGLAND ET AL 3,403,352
LASER HAVING EFFICIENT COUPLING BETWEEN A PHOSPHOR PUMP
SOURCE AND THE LASER MEDIUM
Original Filed March 15, 1963 3 Sheets-Sheet 1

United States Patent Office 3,403,352
Patented Sept. 24, 1968

3,403,352
LASER HAVING EFFICIENT COUPLING BETWEEN A PHOSPHOR PUMP SOURCE AND THE LASER MEDIUM
Jon W. Ogland, Glen Burnie, and Charles W. Baugh, Jr., Severna Park, Md., assignors to Westinghouse Electric Corporation, Pittsburgh, Pa., a corporation of Pennsylvania
Continuation of application Ser. No. 266,146, Mar. 15, 1963. This application Apr. 10, 1967, Ser. No. 629,828
6 Claims. (Cl. 331—94.5)

This application is a continuation of application Ser. No. 266,146, filed Mar. 15, 1963, now abandoned.

This invention relates to improvements in optical masers, commonly referred to as lasers. More particularly, the invention relates to improvements in lasers pumped by an optical source capable of being modulated at high frequency.

It is well understood that a maser employs an active medium, either gaseous, liquid or solid, in which there can be established by "pumping action" at least intermittently, a non-equilibrium population distribution in at least a pair of the spaced energy states of its electrons. This "pumping" process is also called "state preparation." In this non-equilibrium state, the medium is said to have a negative temperature. Since the system is always tending to revert to the equilibrium state by a process competing with the pumping process, known as relaxation, the negative temperature condition represents stored potential energy.

Accordingly, it follows that some means is necessary to supply energy to such a system to excite the electrons from their equilibrium states to the non-equilibrium states.

In such a system, the stored potential energy is evidenced by the negative temperature of the active medium and when the energy is released it will be in the form of wave energy of a predetermined frequency or frequencies. The frequencies are determined by the negative temperature states which satisfy Planck's Law with respect to any two energy levels which are in non-equilibrium represented by the equation $$\nu = \frac{E_2 - E_1}{h} \quad (1)$$

where $E_2$ and $E_1$ represent, respectively, the upper and lower energy levels and $h$ is Planck's constant. If there be applied to the active medium, which is at a negative temperature, a frequency which satisfies Equation (1) the applied signal will stimulate the emission of radiation at the signal frequency and the radiated energy will be in phase with and amplify the applied signal.

This may be a continuous process if energy is continuously supplied to the medium in the form of the pumping energy to cause continuously, in a cyclic fashion, electrons of the medium to be excited from one or more of the lower energy states to higher energy states from which the electrons fall back to lower energy states as they emit radiation to complete their energy-transition cycle.

In lasers the pump frequency is usually higher than the lasing or amplifying frequency. Also in converting from the usual commercial power sources to energy at the pump frequency there are usually two or three frequency conversion steps involved. The last step also usually involves a conversion from non-coherent to coherent radiation. Since the means involved in such conversion steps almost never achieve 100% efficiency there are necessarily energy losses involved. Also in some lasers, particularly those using a solid state active medium, the energy supplied to create the negative temperature of the medium is at frequencies representing energy state differences substantially greater than those corresponding to the frequency of the signal to be amplified. This means that energy at any frequency absorbed by the active medium but not at a frequency that can be used in the stimulated emission radiation amplification process results in heating of the medium and thereby causes a decrease in overall efficiency.

There is a greater probability for a portion of the atoms of active media being excited to higher energy states by wave energy in certain bands of frequencies than for the other atoms. Since the atoms absorb energy as they go from their lower to their higher energy states, this band of frequencies constitutes the absorption band of the media. The atoms excited to the higher states do not return to their lower energy states by the same route by which they go to their higher states. Many of these more highly excited atoms spontaneously emit radiation as they go from their higher states to a lower state and then when there is an interaction between wave energy and a frequency which corresponds to the difference between the energy states to which they have spontaneously emitted and their lower normal state, they emit coherent electromagnetic wave energy by stimulated emission of radiation. The energy at frequencies corresponding to the difference between the energy level from which stimulated emission occurred and the other energy states in the absorption band must be absorbed by the active medium in the form of heat. It is for this reason that it is desirable to pump a medium with energy at a frequency as close as possible to that at which the stimulated emission radiation occurs in order to reduce the amount of energy which is dissipated to the lattice structure of the crystal and thereby to reduce the amount of the heating of the medium. Heating of the medium not only reduces the efficiency but it also adversely affects the lasering action.

In accordance with the present invention the absorption band of the active maser medium is so related to the pump frequency spectrum that substantially all of the output frequency spectrum of the pump source falls within the absorption band of the active medium and is at the same time near the frequency at which stimulated emission takes place, thus increasing the overall efficiency.

Accordingly the primary object of the present invention is to provide a new and improved optical maser embodying improved means for converting electrical energy to optical energy for state preparation of active maser media.

In a copending application of Irwin Wieder, Ser. No. 569,559 filed July 28, 1966, which is a continuation of application Ser. No. 220,938 filed Aug. 27, 1962, now abandoned which in turn is a continuation of application Ser. No. 816,582 filed May 28, 1959, now abandoned, owned by the assignee of this application, a system is described and claimed in which energy at optical frequencies is derived from a source of electrical power, either direct current or at the commercial power source frequencies, for pumping active maser media to produce state preparation for maser action. In this copending application advantage is taken of the fact that in some media the absorption band is wider than the substantial line spectrum of the emission band and therefore a source of light having a rather wide band of frequencies is absorbed by the media and then emitted at the narrow line spectrum. While the means shown therein is an improvement over prior art devices, the present invention provides an improvement over the system in the copending application in that it provides means for efficiently converting electrical energy to optical energy entirely within the absorption band of the medium and very close to the emission band of the medium and therefore results in a very greatly increased efficiency in state preparation of the active medium.

Another object is to provide a new and improved optical maser employing an improved means for converting electrical energy to optical energy for state preparation of active maser medium at improved efficiency.

Another object is to provide a new and improved solid state light source for pumping optical maser medium.

A still further object is to provide a new and improved solid state optical maser capable of operating efficiently at high power output.

Another object is to provide a new and improved optical maser in which the coherent output optical energy can be faithfully modulated at very high frequencies.

A still further object is to provide a new and improved solid state light source which can be so arranged with respect to the maser media as to provide very high flux density and an improved optical coupling coefficient between the light source and the active maser media.

Another object is to provide an improved optical maser in which the active medium is optically pumped by the emission from properly selected phosphors excited by an electron stream.

Still a further object is to provide a new and improved optical maser, the construction of which is such as to provide great flexibility in matching the emission from phosphors excited by high energy electrons with the absorption band of the active medium.

Another object is to provide a new and improved optical maser in which linear modulation of the coherent output optical energy can be effected by an electrical control signal.

Another object is to provide a new and improved optical maser in which substantially all of the optical output from a solid state optical pumping source of extended area is caused to impinge by multiple reflection upon a solid state active medium of substantially smaller surface area than that of the optical source.

A still further object is to provide a new and improved optical maser in which an electron-excited phosphor surface providing a source of optical pumping energy and a solid state active medium pumped thereby can be cooled independently of each other.

The invention itself, both as to its organization and method of operation as well as additional objects and advantages, will best be understood from the following description when read in connection with the accompanying drawings in which.

Figure 4B:
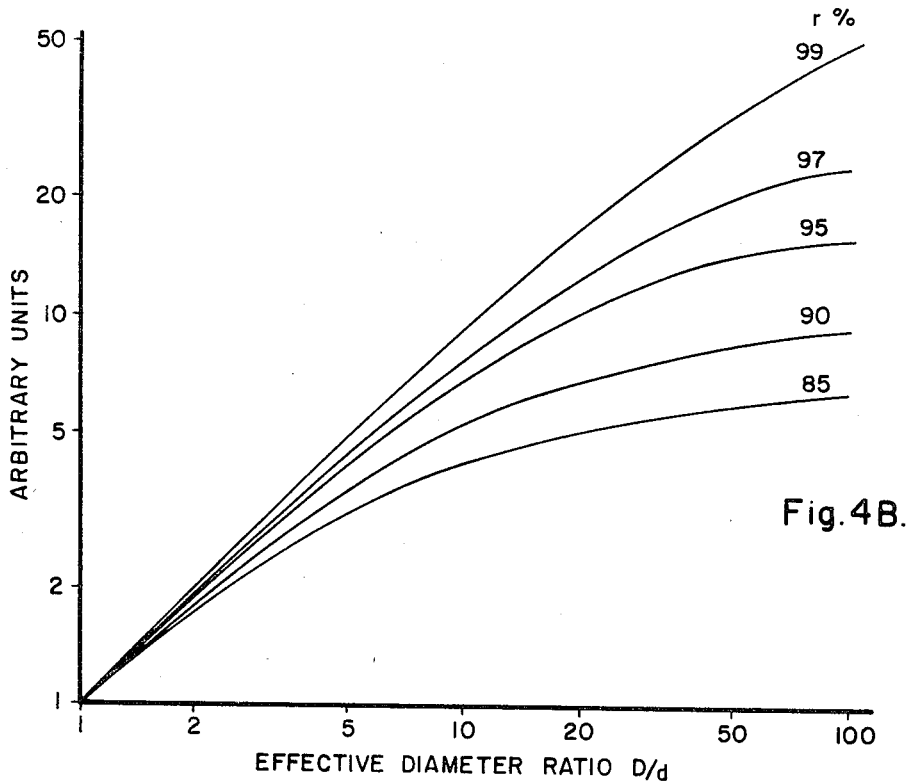
Figure 4A:
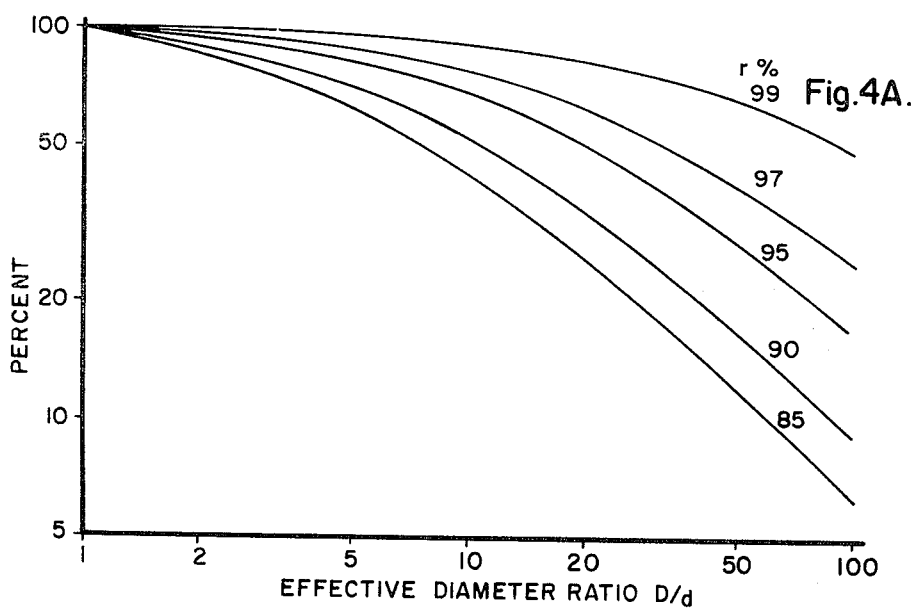
Figure 5:
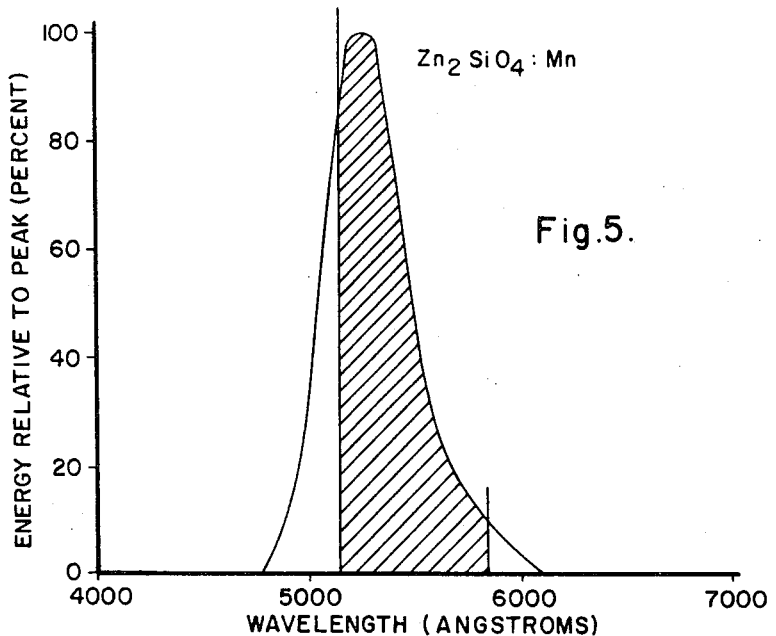
Figure 6:
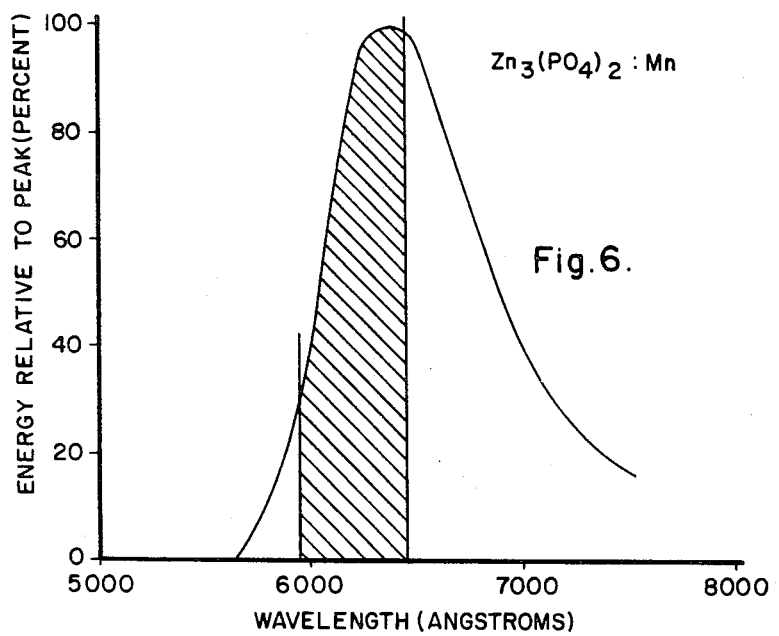

FIGURES 4A and 4B are graphs with the same abscissa showing respectively, (1) the fraction of the total radiation intercepted by the crystal for various phosphor reflectivities as a function of the effective diameter ratio D/d, and (2) the total intercepted radiation, that is S×D, as a function of the effective diameter ratio D/d. In both graphs the curves are for reflectivities indicated in terms of percentages total reflectivity;

FIGURE 5 is a graph showing the relation between the spectrum of a selected phosphor and the absorption band of a sample of ruby maser medium; and FIGURE 6 is a similar graph showing the relation between the spectrum of another selected phosphor and the absorption band of a sample of samarium-doped calcium fluoride active medium.

In addition to the aforementioned Wieder copending application mentioned above, in an application in the name of Jon W. Ogland, Ser. No. 641,710 filed May 26, 1967, which is a continuation of application S.N. 265,461 filed concurrently with the filing of this application, and assigned to the same assignee of this application, and now abandoned, there is disclosed and claimed means for optically pumping solid state media by means of emission from phosphors which are excited by an electron stream. The present invention is directed to a device which is more closely related to apparatus disclosed in the Ogland application. The purpose of this invention is to provide a new and improved optical maser in which means are provided for multiplying the flux density impinging upon a sample of active medium surrounded by an electron-excited phosphor surface.

Broadly speaking, the present invention comprises means for providing a high current, high density, high voltage electron flood beam which is directed onto a layer of phosphor arranged on an extended cylindrical cavity surface surrounding a sample of solid state active medium. The phosphor has a fast-decay-time and is properly selected so that its emission frequency coincides substantially with the absorption spectrum of the sample of active maser medium. Although a sample of solid state active medium is shown the invention is also applicable to gaseous or liquid active media suitably contained to constitute a body of the active sample. The electrical energy for producing the electron flood beam is converted into optical energy at the desired pump frequency by the phosphor on the surface surrounding the body of active medium. By selecting an active medium in which the optical absorption band is near the radiation emission band of the active medium high efficiency is obtained and therefore a high percentage of the optical energy is utilizable in causing state preparation of the electrons of the active medium to produce the necessary negative temperatures and maser action in the medium. This greatly enhances the overall efficiency of the system as compared to systems heretofore provided.

A significant feature of the present invention is the arrangement of the layer of phosphor material on an enclosed reflecting substrate, having very high reflectivity, the substrate and the phosphor layer being arranged around the maser medium, illustrated herein as being in the form of a rod. Because of the diffuse reflection of the phosphor surface, as hereinafter more fully pointed out, multiple reflection takes place resulting in highly efficient optical coupling between the phosphor and the active maser medium.

Since the radiation spectrum of the phosphor is determined by the energy level of the activators in the phosphor crystal lattice structure the phosphor emission spectrum can be matched to the absorption band of the active medium very readily by the proper choice of activators and the crystal lattice structure to thereby obtain the best pump efficiency and the least heating of the laser medium. The density of the radiation, that is, the amplitude of the emitted optical energy is determined by the density and the voltage of the exciting electron beam and, therefore, the source of emitted radiation can be readily modulated by suitably modulating the electron beam.

The device briefly described above may be referred to as a cathodoluminescent pumped optical maser. An improved embodiment of such a device in accordance with the present invention is illustrated in the drawings.

Figure 1:
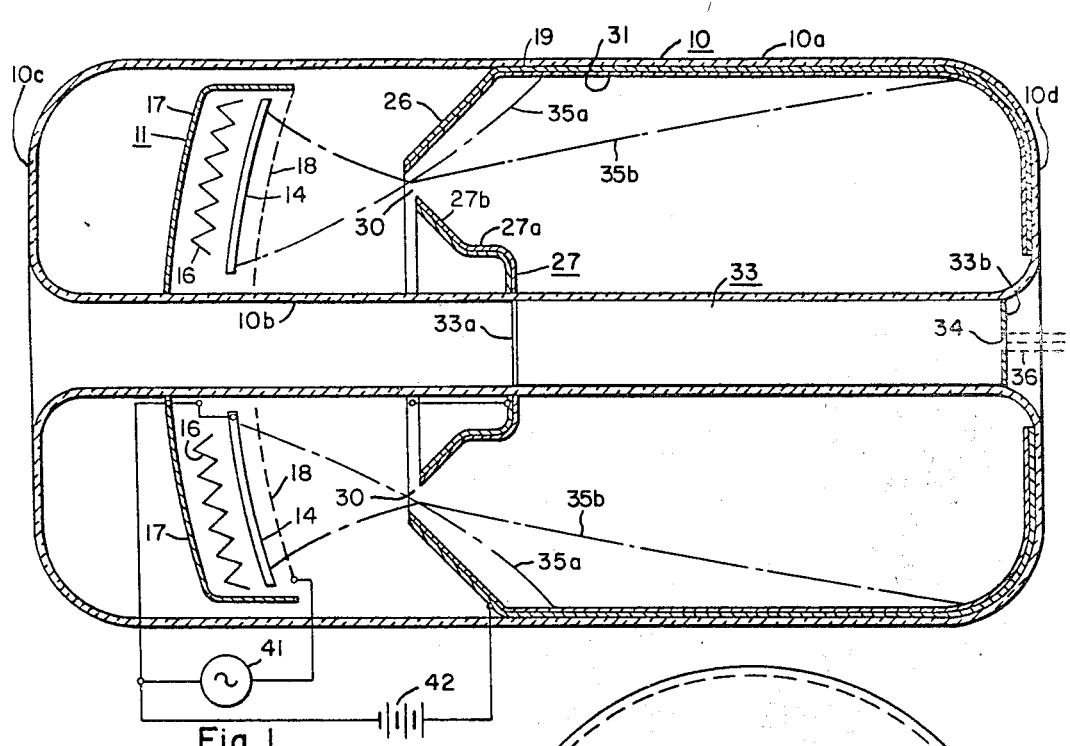
FIGURE 1 is a sectional profile view of apparatus made in accordance with the present invention.
Figure 2:
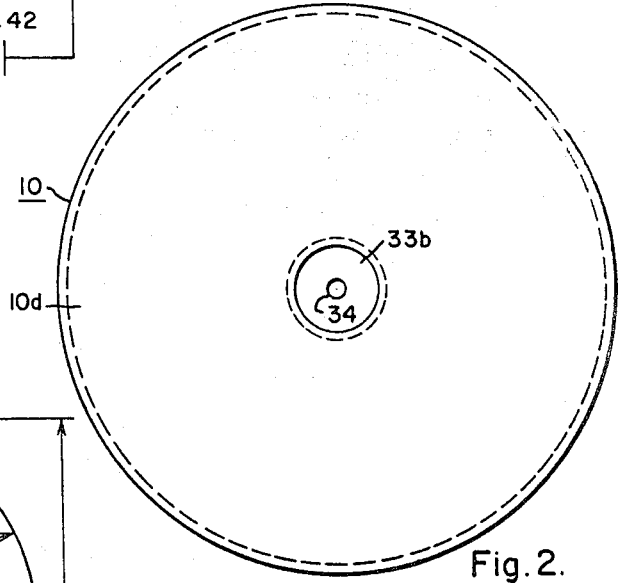
FIG. 2 is an end view of FIGURE 1.

Referring to FIGURE 1, there is illustrated schematically a special cathode ray tube 10, which is essentially two concentric cylinders 10a and 10b joined by two end walls 10c and 10d. An annular cathode structure 11 is arranged with its axis coincident with the axis of the cathode ray tube. The cathode structure 11 is suitably supported between the inner and outer cylindrical portions of the envelope of the cathode ray tube. The cathode structure 11 is provided with an electron emitting surface 14 in the general form of a concave disc-like annular member. It is adapted to be heated by a resistance heating element 16 arranged at the back side of the emitting surface 14. Any suitable heat reflector and shield 17 is arranged behind the heater element 16 to concentrate the heat on the electron emitting surface 14. In front of the emitting surface 14 is a suitable control electrode 18 suitably supported in fixed relation to the cathode structure 11.

As schematically illustrated the envelope of the cathode ray tube 10 would be made of glass to solve insulation problems but in an embodiment under construction the right-hand end, containing the anode and field shaping means, is made of metal while the left-hand end, containing the cathode and control electrode is made of glass.

Associated with the cathode 11 are field forming electrodes and an electrically conducting substrate 19 on the inner surface of the right-hand end of the outer cylinder 10a, constituting the electron-collecting anode, for the purpose of producing a uniformly distributed electron flood beam onto a layer of phosphor on the substrate.

To this end, in front of the electron emitting surface 14 are two frustoconical conducting shields, an outer shield 26 and an inner shield 27. The outer shield 26 is supported by the inside surface of the cathode ray tube 10. The inner shield 27 has a cylindrical portion 27a and an outwardly flaring portion 27b. The outer extremity of the flared portion 27b is slightly smaller in diameter than the inner extremity of the shield 26. Also the outer extremity of the conical portion 27b of the inner shield is spaced a predetermined distance farther from the electron emitting surface 14 than the inner extremity of the outer shield 26. The spacing of the two shields forms an annular open space 30.

The shields 26 and 27 serve the dual purpose of shaping the form of the electron flood beam, when energized by the appropriate potentials, while at the same time serving as a heat shield to prevent the heat from the cathode structure 11 from passing into the right-hand side of the interior of the cathode ray tube envelope where the phosphor is located. When appropriate potentials with respect to the cathode 11 are applied to the shields 26 and 27 a hollow annular electron beam will be generated between the two adjacent extremities of the shields 26 and 27. This annular electron beam is made up of individual electron streams, the outer confines of which are represented by the dotted lines 35a and 35b which cross substantially at the center of the annular space 30 between the adjacent extremities of the shields 26 and 27. The individual electron streams diverge from the annular space 31 and fan out into a substantially pestle-shaped envelope that terminates on the substrate 19 and the phosphor layer thereon. The formation of the flood beam of electrons is a conjoint action of the electric fields applied between the cathode 11, the shields 26 and 27 and the conducting substrate 19.

As previously mentioned, the envelope of the cathode ray tube of the illustrated embodiment is made of glass and therefore the substrate 19 may be a thin film of aluminum deposited on the inner surface of the right-hand portion of the outer cylinder 10a. If this portion of the envelope were made of metal, such as copper, the inner surface would be finished to the nearest practical approach to an optical finish and on top of this would be deposited a thin layer of silver.

In either event, on top of the substrate 19 is deposited a layer of phosphor 31 of selected characteristics which are correlated with the properties of a sample or body, of maser medium 33 in the form of a rod which in length is coextensive with the substrate 19 and the phosphor layer 31.

The laser rod 33 may be held in adjusted position in the inner cylinder 10b in any suitable manner that does not interfere with the optical coupling between the optical energy from the electronically excited phosphor layer 31 and the laser rod 33. For example, metallic frictional clips could be attached to the end of the rod and be in frictional engagement with the inside of the cylinder 10b. On the other hand, a manipulating rod could be attached to the inner end of the laser rod 33 and suitable adjusting means be operably associated with the manipulating rod to properly position the laser rod 33.

In accordance with usual practice in optical masers the two ends 33a and 33b of the laser rod 33 are optically parallel, the inner end 33a being provided with a highly reflective coating, such as aluminum, while the other end 33b is coated with a highly reflective layer having a small aperture 34 in the center constituting the coherent optical energy output iris through which a coherent light beam 36 is emitted.

When the high voltage electrons from the emitting surface 14 of the cathode 11 are directed through the annular area 30 between the shields 26 and 27 and are distributed to bombard substantially uniformly the inner cylindrical surface of the phosphor layer 31 the radiant energy from all points on the phosphor will be diffusely reflected toward the laser rod 33 and other parts of the interior of the cathode ray tube envelope. In other words, the construction illustrated and described comprises an optical maser in which a body of laser medium is completely surrounded by a source of multiply reflected radiant energy substantially all of which eventually is incident upon some portion of the laser rod 33, the only limit being losses which occur by reason of the fact that no material has a coefficient of reflectivity of 100% and certain other losses, such as that which might occur by reason of some light escaping through the narrow annular space 30 between the shields 26 and 27 into the vicinity of the cathode 11.

It has been mentioned previously that the radiation density of the optical energy from the phosphor is determined by the density and voltage of the exciting electron beam. For substantially all phosphors and particularly for those selected for use in accordance with the present invention, the radiant energy emitted by the phosphor bears a linear relation to the density of the exciting electron flood beam. Accordingly, the radiant energy from the phosphor layer 31 can be flexibly controlled and readily modulated by controlling the density of the electron flood beam. The electron flood beam can be completely cut off or smoothly modulated by a control voltage applied to the control electrode 18.

In the operation of the optical maser in accordance with the present invention the heater 16 may be energized by any suitable source, not shown. Connected between the cathode electron emitting surface 14 and the control electrode 18 is a suitable source of modulating voltage 41. A suitable source of high direct current potential 42 is connected between the cathode 11 and the outer shield 26 and the inner shield 27 and the conducting substrate 19, the latter being electrically connected to the outer shield 26. The density of the electron beam will be determined by the voltage of the source 42 and the modulating voltage source 41. The modulating source 41 may be a source of negative potential sufficient to bias the cathode ray tube below cut-off or it may be a source of smoothly varying voltage to produce a smooth and continuous variation in the amount of electrons flowing from the cathode surface 11 to the substrate anode 19.

The phosphor emission spectrum of the phosphor layer 31 may be matched to the absorption band of the active maser medium by the proper choice of composition and activators to obtain the best pump efficiency and the least heating of the maser medium. The absorption band of chromium-doped ruby extends from 5150 to 5850 angstroms. The bandwidth of the spectrum is approximately 700 angstroms. The absorption band of samarium-doped calcium fluoride is from 5950 to 6450 angstroms. The bandwidth for the calcium fluoride maser medium is approximately 500 angstroms. The green-emitting $Zn_2SiO_4$:Mn phosphor has an emission spectrum which extends from less than 5,000 angstroms to a little beyond 6,000 angstroms as illustrated in the graph of FIGURE 5. As also illustrated in the graph, approximately 75% of the emission of this phosphor falls within the ruby absorption band. The chromium-doped ruby operates at room temperature but requires an irradiation on the order of 500 watts per cubic centimeter, and above to obtain maser action.

There are several commercial phosphors which have an emission spectrum which substantially covers the samarium-doped calcium fluoride absorption band. One of these is $Zn_3(PO_4)2:Mn$ which has an emission spectrum as shown in FIGURE 6. The samarium-doped calcium fluoride has a threshold irradiation requirement of 20 watts per cubic centimeter but for laser operation it must be kept at liquid nitrogen temperature. With the construction shown if it is desired to use a sample of the calcium fluoride laser medium, the rod 33 could be made hollow to receive the liquid nitrogen. If the ruby crystal is used it is necessary only to provide means for cooling the crystal to room temperature.

In addition to the flexibility of control and the linear modulation of the solid state maser optical pumping source which is provided by the electronically bombarded cylindrical phosphor layer 31, there are two other important features of the invention, namely, first, the feasibility with which the heat may be extracted independently from the enlarged cylindrical phosphor surface and the maser medium, and second, the multiplication of the flux density obtainable by the arrangement illustrated herein.

For the purpose of extracting the heat from the phosphor layer 31 the right hand cylindrical body of the cathode ray tube 10 may be provided with any suitable heat exchange means, (not shown). An indicated previously, a glass envelope is shown in the illustrated embodiment and therefore convenient means for cooling would be a gaseous connection medium, including air. However, for an emodiment of very high capacity where a metal envelope may be used, heat exchanger means using a liquid coolant would be more feasible. An important aspect of the invention is that the phosphor is arranged on the large cylinder encircling the maser medium and being spaced therefrom provides substantial thermal isolation. Also because of the large surface area of the phosphor, sufficient optical energy can be obtained when operating the phosphor substantially below its saturation value, thus resulting in longer operating life. This is particularly true since the electron bombarded cylindrical phosphor layer 31 constitutes a flux density multiplier for all the optical energy emitted by the phosphor.

It has been mentioned previously that the emission band of the phosphor falls within the absorption band of the sample of laser media and therefore there is an efficient optical coupling between the optical energy from the phosphor and the maser material. Also the spectrum of the phosphor emission is near the line spectrum of the coherent output of the maser medium and therefore a minimum of down conversion takes place resulting in reduced heating losses in the maser media.

Figure 3:
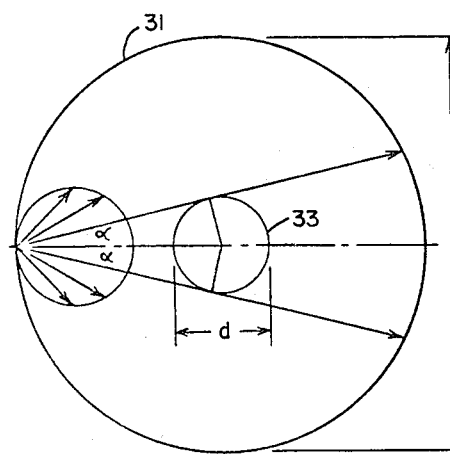
FIG. 3 is a schematic illustration of the manner in which the optical energy from the phosphor material is coupled to the maser medium by multiple reflection.

The conducting aluminum film 19 has a very high coefficient of reflection and likewise the phosphor layer 31 deposited on the aluminum film has a reflectivity ranging between 88% and 99%, and in some cases approaches 100%. The conducting film and the phosphor layer are preferably extended over the surfaces of the field-forming electrodes 26 and 27 and the right hand end wall of the envelope so that there is a maximum of optical energy reflection and minimum loss of optical energy from the right hand side. The shields 26 and 27 incidently serve as heat shields to minimize the transfer of heat from the cathode into the right hand part of the envelope containing the phosphor. The radiation from any one point of the phosphor surface is Lambertian, that is, the strength of radiation is a function of the cosine angle of radiation. This is illustrated in FIGURE 3. Consequently, the maximum density of radiation is directed radially toward the sample of laser medium 33 from each and every point of the phosphor film 31. As illustrated in FIGURE 3, a considerable portion of the radiation falls on either side of the laser rod 33 and strikes the wall of the phosphor film 31 on the other side where it is again diffusely reflected. This reflection is also Lambertian. For each originally excited phosphor spot a series of multiple reflections with diminishing brightness takes place. It will be readily seen that when the entire surface of the phosphor layer 31 is simultaneously excited by the electron flood beam optical energy is proceeding simultaneously from each and every spot on the film and simultaneously being reflected diffusely in such a manner that part of the radiation falls on the laser rod 33, the axis of which coincides with the axis of the internal cylindrical surface 31.

Detailing this further, a portion $a$ of the radiation from any one spot on the phosphor included in the angle $2\alpha$ FIGURE 3, is intercepted by the laser rod 33 at each time a reflection takes place. Of the remainder, a fraction $r$ is reflected, $r$ being the optical reflectivity of the phosphor. The radiation intercepted by the laser rod 33 from the sequence of the reflections may be expressed mathematically as:

$$S = a + ar(1-a) + ar^2(1-a)^2 + ar^3(1-a)^3 + \ldots$$

(Equation 1)

Using the summation formula for an infinite geometric progression, the radiation intercepted by the crystal is given by:

$$S = \frac{a}{1 - r(1-a)} \quad \text{(Equation 2)}$$

Due to the radiation from the phosphor surface 31 being Lambertian, the interception factor $a$, is larger than the peripheral angle subtended by the effective diameter of the laser rod 33. The cosine radiation pattern gives an interceptance factor, $a-a$, that, if end effects are neglected is:

$$a = \frac{2B \int_0^\alpha \cos \alpha \, d\alpha}{2B \int_0^{\pi/2} \cos \alpha \, d\alpha} = \sin \alpha = \frac{d}{D}$$

(Equation 3)

where $d$ is the effective diameter of the laser rod 33 (this effective diameter is slightly less than the actual diameter) and $D$ is the diameter of the cavity, that is, the diameter of the cylindrical phosphor surface layer 31. Combining Equations (2) and (3) the following is obtained:

$$S = \frac{d/D}{1 - r\left(1 - \frac{d}{D}\right)} \quad \text{(Equation 4)}$$

which expresses the fraction of the total radiation intercepted by the laser rod 33. This variation of this fraction as a function of the effective diameter ratio $D/d$ is illustrated in FIGURE 4A.

As is apparent from Equation (4) the interceptance factor $a$ decreases for increasing ratio of $D/d$. The total flux emitted from the phosphor in the cavity formed by the phosphor layer 31 increases however, in proportion to the cavity diameter because of the increasing phosphor emitting surface. The product $S \times D$ therefore, is a measure of the radiation incident upon the laser rod 33. This product is plotted in FIGURE 4b as a function of the effective diameter ratio $D/d$.

It is evident from the above that the arrangement of the present invention produces a considerably higher optical flux density upon a laser rod 33 located centrally of the cavity chamber formed by the phosphor layer 31 than could be obtained by depositing a phosphor layer directly on the laser rod 33. The present invention is not limited to the specific configuration shown. For example, the phosphor layer 31 and the sample of laser medium 33 could take the form of two concentric spheres. It will be apparent that the multiple reflection phenomenon resulting from the present construction is capable of providing a flux density which is many fold higher than that available directly at a phosphor surface. The present construction is capable of very high power pulse or continuous operation by reason of the fact that the multiple reflection increases the flux density and any energy losses in the phosphor itself can be readily dissipated since it is completely physically displaced from the sample of laser medium which can also be cooled completely independently.

While the invention has been shown in but one form, it will be obvious to those skilled in the art that it is not so limited, but is susceptible of various changes and modifications without departing from the spirit thereof.

We claim as our invention:

1. Maser apparatus comprising a light-confining diffusely reflecting enclosure, a negative temperature medium supported in said enclosure, a source of electron beam energy, phosphor pumping means supported on the inner surface of said enclosure and disposed for bombardment by said electron beam energy for production of light output for pumping said medium, said enclosure and said phosphor means completely surrounding said medium except for an opening area for ingress of said electron beam energy and an opening area for emission of coherent light output from said medium, the respective areas of said ingress and emission openings being small compared to the surface area of said medium, said diffusely reflecting enclosure being related to said medium in such a way that substantially all of said optical pumping light which is not absorbed as a result of direct impingement upon said medium will be diffusely reflected by said enclosure, whereby the absorption of said pumping light by said medium is substantially enhanced by multiple reflection of said pumping light.

2. The combination as set forth in claim 1 in which said enclosure is cylindrical in shape, said medium is in the form of an elongated rod and said source of electrons includes an annular cathode for producing a hollow annular beam of electrons substantially concentric with the axis of said rod.

3. The combination as set forth in claim 2 in which said enclosure is in the shape of a surface of revolution.

4. The combination as set forth in claim 2 in which said enclosure is an annulus formed by two concentric cylindrical surfaces with the inner surface of the outer cylinder having an electrically conducting element serving as the anode of said electron source, said phosphor means being on the inside of said conducting element and an annular beam shaping electrode is interposed between said cathode and said element.

5. The combination as set forth in claim 1 in which said phosphor is $Zn_3(PO_4)_2$:Mn and said medium is samarium-doped calcium fluoride.

6. The combination as set forth in claim 1 in which said phosphor is $Zn_2SiO_4$:Mn and said medium is ruby ($Al_2O_3$:$Cr^{+3}$).

References Cited

UNITED STATES PATENTS 2,314,096   3/1943   Leverenz _____ 331—94.5
3,202,934   8/1965   Coffee _____ 331—94.5

JEWELL H. PEDERSEN, *Primary Examiner.*

E. BAUER, *Assistant Examiner.*